Sept. 19, 1950    W. BENNETT    2,522,740
TRAILER COUPLING
Filed Sept. 20, 1946    3 Sheets-Sheet 1

Inventor
Walter Bennett
Barklow & Scout Hebury
Attys.

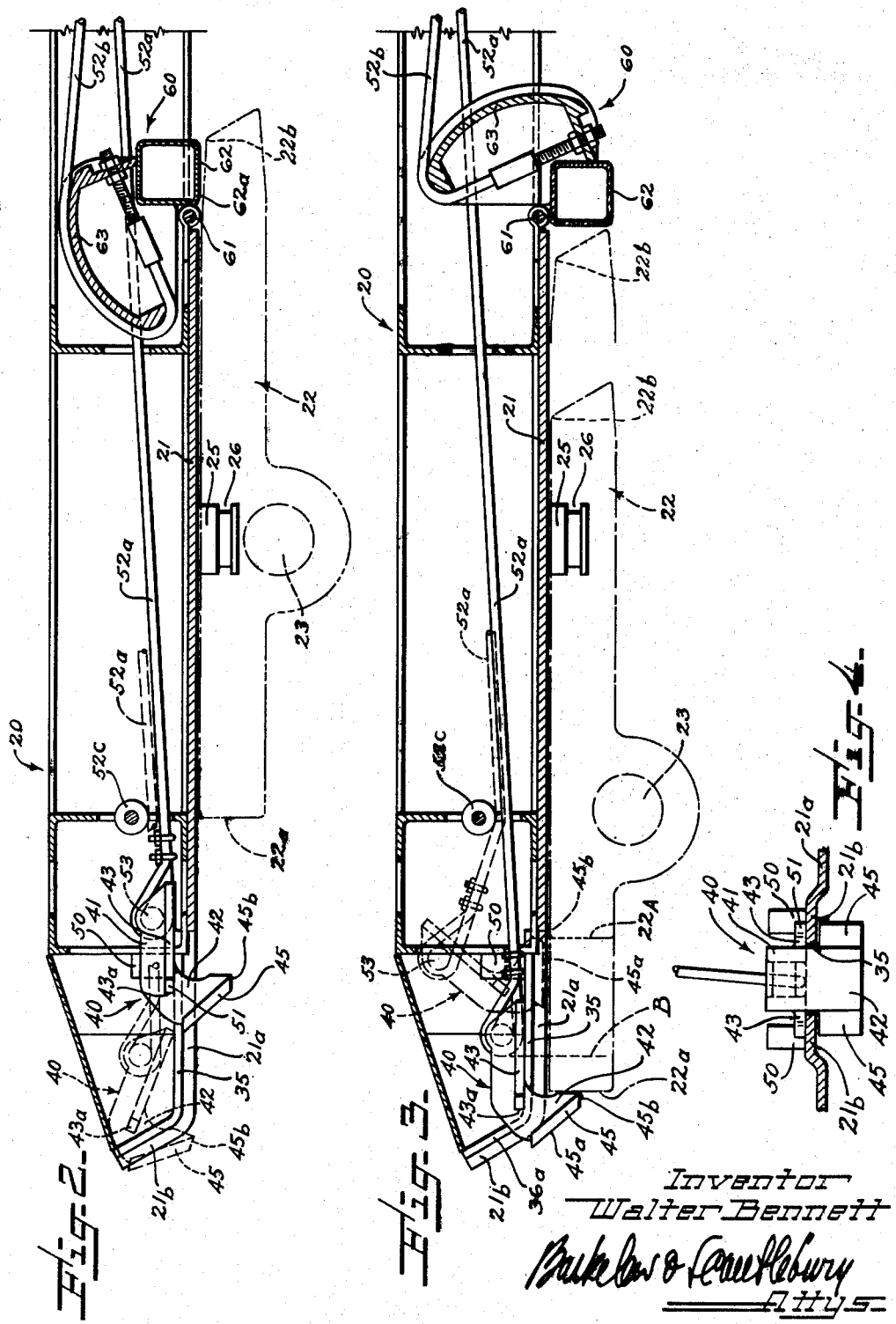

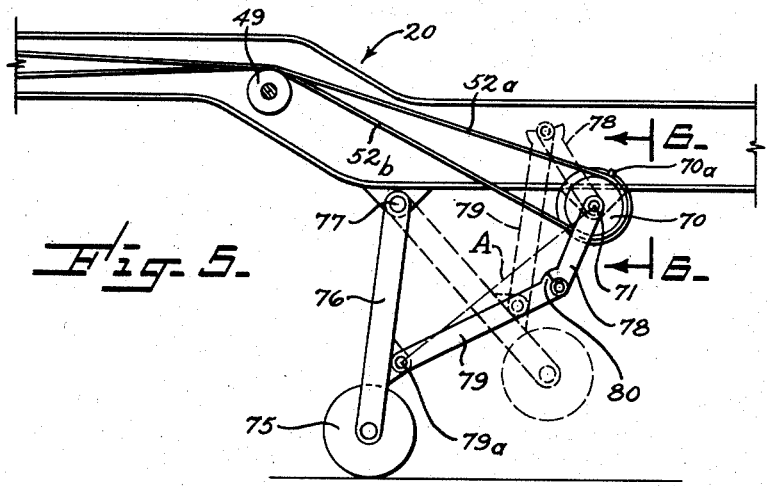
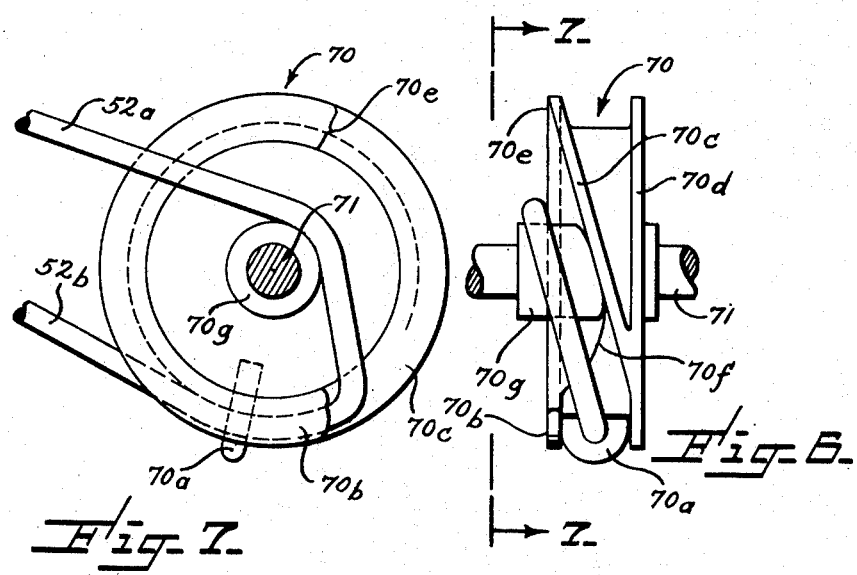

Patented Sept. 19, 1950

2,522,740

UNITED STATES PATENT OFFICE 2,522,740

TRAILER COUPLING

Walter Bennett, Los Angeles, Calif., assignor to Utility Trailer Manufacturing Company, Los Angeles, Calif., a corporation of California Application September 20, 1946, Serial No. 698,095

13 Claims. (Cl. 280—33.05)

This invention relates to the coupling and support of semi-trailers; the general purpose of the invention being to provide a simplified form of cooperative mechanism which cooperates the coupling operation with the trailer support in such a manner as to insure the support being in fully operative position to support the trailer when the coupler is released or when the trailer is freed from the towing vehicle.

One of the major characteristics of the invention, and which contributes much to its simplicity, resides in its capability of utilizing, and its preferred provision of, a simple form of flexible connection, involving a flexible connecting member such as a chain or cable, or any other suitable flexible element which performs a function like that of a belt or tape. Linkage systems, including such elements as push rods, shafts, arms and links have commonly been heretofore used for effecting the connection between the coupling operation and the support. Such connective arrangements have usually involved not only a plurality of members but have also necessitated some accuracy in the mounting of those members in bearings upon the trailer frame. The use of a simple flexible member as the interconnective element does away with most of the necessity for accuracy of mounting.

In an interconnected system using a flexible inter-connecting element such as a cable, it is another feature of the invention that it provides means which compensate for elastic stretch of the cable, making certain that the support is in its fully effective supporting position, and forced to that position if necessary, and finally locked in that position, before the trailer can be detached from the towing vehicle.

The present invention has more specifically to do with the design of such a cable connectible system so as to make it applicable to a tractor-trailer combination in which the king-pin or other equivalent coupling element is mounted on the trailer and the coupler which lockingly engages the king-pin is mounted on the tractor. In a copending application filed on even date herewith, Ser. No. 698,094, now Patent No. 2,471,555, granted May 31, 1949, I have applied the flexible inter-connective means to a tractor-trailer combination wherein the king-pin is mounted on the tractor and the coupler or lock is mounted on the trailer.

I may remark preliminarily, what will be pointed out more fully later, that although my present invention provides a design intended preferably to utilize flexible connections and to be used in a combination where the king-pin is on the trailer, the invention in its broader aspects is not limited to those things. Linkage connections may be substituted for the cables; and the devices of the invention are just as capable of performing their functions in a king-pin-on-tractor combination as in the other combination. In either case it is one of the major features and practical advantages of my invention that it requires no change in standard tractor structures.

The general nature of the present invention, and other objects and characteristics of the invention together with its corresponding accomplishments, will be best understood from the following detailed description of an illustrative and specific embodiment of the invention which is shown in the accompanying drawings where Fig. 1 is a fragmentary plan showing the forward end of a trailer structure, showing diagrammatically the parts of the coupling system which are mounted on the tractor, and also showing in one illustrative embodiment the forward parts of the system involved in my invention;

Fig. 2 is a longitudinal vertical section taken as indicated by line 2—2 on Fig. 1 and showing the parts in the positions of Fig. 1;

Fig. 3 is a similar longitudinal section showing the parts in positions which are assumed during the operations of disconnecting and connecting the tractor with the trailer;

Fig. 4 is a detail cross-section taken as indicated by line 4—4 on Fig. 1;

Fig. 5 is a diagrammatic elevation illustrating a simple and typical form of trailer support, which is typical of various forms of supports which may be utilized in my invention;

Fig. 6 is an enlarged fragmentary detail taken in the aspect indicated by line 6—6 on Fig. 5, and Fig. 7 is a view of the parts shown in Fig. 6 in the aspect indicated by line 7—7 on Fig. 6.

Figure 1:
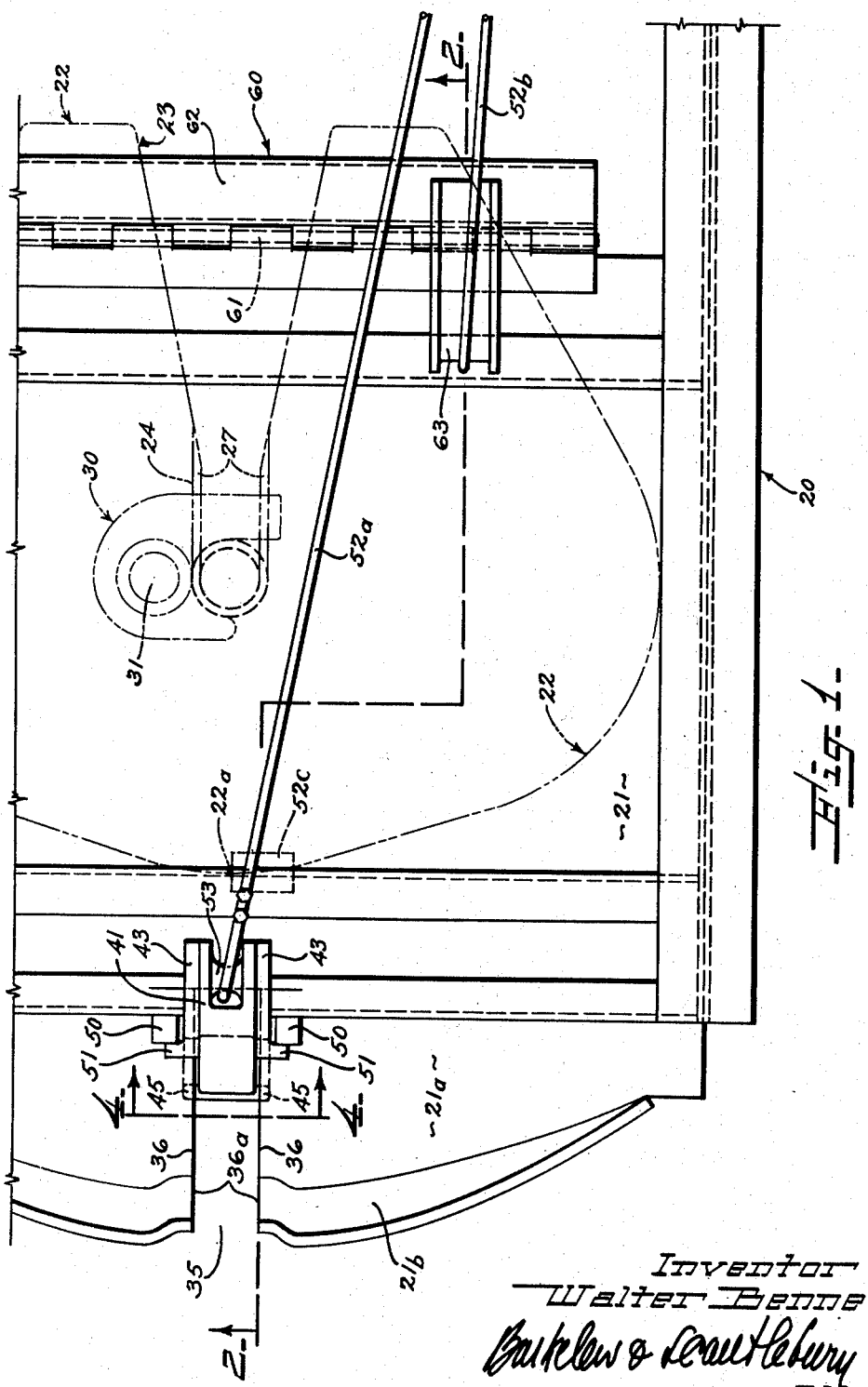

In the drawings the numeral 20 designates generally any suitable framing of the trailer, the rear end of which is supported on wheels in any usual manner, but not here shown. The framing may be of any suitable kind. The forward part of the trailer frame is usually provided with a lower plate 21 adapted to present a suitable surface for riding over the upper surface of the tractor fifth wheel, which is here shown diagrammatically at 22. Such a fifth wheel is usually mounted to rotate about a central vertical axis, and also to tilt about a horizontal axis which is here indicated at 23. And in the arrangement where the king-pin is carried on the trailer, the tilting fifth wheel 22 is usually provided with a converging slot 23 leading from its rear edge forwardly to its central portion where it merges into a parallel walled slot 24 equipped with some suitable formation which is underhung by the lower end of the king-pin. As a typical illustration, the king-pin 25 is here shown as mounted on the under side of trailer plate 21 and as having a peripheral groove 26 near its lower end adapted to be engaged by ribs 27 which project from the side walls of slot 24. A suitable coupler or lock is provided for locking the king-pin in the forward end of slot 24, such being here illustrated typically as a swinging lock 30 mounted on the fifth wheel to swing about the pivot 31. Such a lock is usually designed to be manually operated for either locking or releasing, or both. Typically, it may be a lock which closes and locks automatically as the king-pin moves to the forward end of slot 24, and which is released by hand.

The fifth wheel as here shown is of the present standard type, and is intended to typify any similar or equivalent member which may be used on trucks or tractors. It is one of the advantageous features of my interconnective mechanism that it will cooperate with any such fifth wheel without requiring any changes or additions therein.

Figs. 1 and 2 show the trailer in its relative position in which the king-pin is locked to fifth wheel 22, and show the parts of my interconnective mechanism in the positions which they assume when the trailer is in that position and the trailer support is in its upper or non-supporting position. In essence, my improved inter-connective mechanism, as here illustrated in typical form, comprises a forward hooked-shaped member adapted to normally lie forwardly of the fifth wheel and to overhang its forward edge, and adapted to be forced forwardly by relative forward movement of the fifth wheel. That hook is connected by cable or other flexible connected to the support, so that forward forced movement of the hook forcibly lowers the support and forcibly locks it in its lowered supporting position. At the forward end of its support-operating movement the hook moves upwardly and out of the way of the fifth wheel to allow the fifth wheel to pass forwardly. The relationship of the parts is such that, with an ample margin of safety, the support is forced down and locked in its supporting position before the hook moves up out of the path of the fifth wheel.

During the re-coupling operation, when the tractor fifth wheel is backed under the trailer, the rear edge of the fifth wheel engages and operates a tilting member which is also flexibly connected with the support and operates to raise the support after the fifth wheel is safely under the trailer and the trailer is safely supported. And provision is made, as will be hereinafter explained in its preferred detail for allowing for forward hook to ride the upper surface of the fifth wheel and to finally drop into position overhanging its forward edge. And, as will hereafter appear, provision may be made so that the support cannot be raised until the forward hook has dropped over the forward edge of the fifth wheel.

As the two support operating devices are actuated by relative movements of the tractor fifth wheel or equivalent or similar member, rather than by the king-pin lock or coupler, it is really immaterial whether the king-pin or the coupler or lock is on the trailer rather than on the tractor. Either element of the coupling combination can be on the tractor.

As shown in the drawings the forward end of the trailer frame is provided with a formation in which a longitudinal slot 35 is formed between two edges 36 which for the most part are horizontal but have their forward ends turned to extend upwardly and forwardly as at 36a. This slot formation may, so far as my invention is concerned, be formed in any suitable structure, but is here shown as being formed in a forwardly extending part 21a of the riding plate 21 hereinbefore referred to. The entire forward edge of this forward plate extension 21a may conveniently be turned up to form a curved angular nose flange 21b which initially engages the rear edge of the tractor fifth wheel to guide the riding plate up over the surface of the fifth wheel. And the slot 35 with its edges 36 and 36a as described may most conveniently be formed in that plate extension 21a and its nose flange 21b. The forward hook, indicated generally by the numeral 40 rides in the described slot.

As illustrated, hook 40 has a hooked-shaped body which is made up of a normally horizontal portion 41 and a forwardly and downwardly hooked portion 42, the hooked portion 42 being of a width which fits the width of slot 35 freely enough for longitudinal movement in the slot. Body portion 41 is either itself wide enough, or has extending side flanges 43, to ride the upper face of plate 21a at the slot edges. This widened or flanged portion of the body does not extend clear to the forward edge of the hook but terminates at a forward edge 43a in such a relative location as is shown in the drawings. The hook portion 42 is provided at its forward part with at least one and preferably two oppositely projecting fins 45. These fins, as here shown, project laterally from the side surfaces of hook portion 42 and, in the aspect of Fig. 2, make an angle of about 45° to the length of the hook body and to the plane body flanges 43. These fins 45 project under the plate 21a of the slot edges. The forward end edges 43a of flanges 43 are located with relation to fins 45 so that the clear distance between end plates 43a and the adjacent faces of fins 45 is greater than the thickness of plate 21a. This is for the purpose of allowing the hook to take the several different positions which are hereinafter described.

In general, the hook may be described as having a forward and downwardly extending hook portion which passes through plate slot 35, as having an upper body or body portion above the plate wide enough to ride the upper face of the plate, as having one or a pair of hook widening fins or flanges on the forward part of the downwardly extending hook portion, and with those fins suitably spaced from the forward extremity of the widened body portion to ride under the lower surface of the plate. The fins stand at an oblique angle and present, together with the forward portion of the downwardly extending hook, an oblique rearwardly and downwardly facing surface 45a.

Rearward movement of the hook in slot 35 is preferably positively limited to the relative position shown in full lines in Fig. 2. In the design as here shown that stop is provided by a pair of stop blocks 50 and a pair of stop lugs 51 which project from the edges of flanges 43 at their forward ends. The cable 52a may be attached to the rear end of hook body 41 in any suitable manner, as by looping the cable around a pin as shown at 53.

The tilting member generally designated by numeral 60 is hinged at 61 to the trailer frame and extends transversely across the frame in a position to be engaged and tilted upwardly by the rear end or edge of the tractor fifth wheel as the latter moves rearwardly under the trailer. As here shown this tilting member is made up of a square box formation 62 which carries a cable attachment sector 63 rigidly mounted on it. Cable 52b is attached to and wraps about that sector as is evident from Figs. 2 and 3.

Cables 52a and 52b may or not be two parts of a single cable. As here illustrated they are the two runs of a single cable which at its rear end wraps around and is clamped to the pulley or sheave 70 on the support operating shaft 71; but, as will be readily understood, the two runs of the cable may be operatively connected with operating shaft 71 in any suitable manner so that pulls exerted alternately upon the two cables will rotate operating shaft 71 in opposite directions.

The form of support shown diagrammatically in Fig. 5 is intended merely to be illustrative of any trailer support which is capable of being raised and lowered, and finally locked in its lowered supporting position, by pulls exerted on one or another of the two cables. It is also illustrative of any suitable type of support in which a lowering movement of the operating member (shaft 71 in this case) is followed by a rather long movement during and throughout which the support is locked in its lowered or supporting position. That is, safe locking of the support takes place at the beginning of the locking movement. The length of this movement during which the support is locked is one of the safety factors in my combination. A drop leg type of support, such for instance as that shown in my Patent 2,417,903, dated March 25, 1947, or in my co-pending application filed on even date herewith, and referred to before, may be used in my present combination. But for simplicity of description I have illustrated herein a simple type of swinging support operated through a link connection.

Fig. 5 shows such a swinging support in full lines in its lowered supporting position and in dotted lines in its raised non-supporting position. Such a support involves one or more ground-engaging members 75 mounted at the lower end of swinging leg or legs 76 pivoted at 77 to the trailer frame. An operating arm 78 is mounted on and rotates with operating shaft 71, and a pivotally connected link 79 connects the outer end of arm 78 with leg 76. In the lowered supporting position arm 78 and link 79 are shown to have swung considerably past straight line A joining the centers of shaft 71 and link pivot 79a. In that position of the parts arm 78 and link 79 shoulder against each other at 80 to prevent movement of leg 76 toward the raised position which is shown in dotted lines in Fig. 5. Also in that position of the parts leg 76 is forward of a vertical line through its pivot 77, so that weight thrust upon the leg tends to prevent its swinging rearwardly toward its raised position.

The leg is raised by rotation of shaft 71 and arm 78 clockwise in Fig. 5, to the position shown in dotted lines. On a subsequent lowering movement of the support, from the dotted line position to the full line position, leg 76 passes through its vertical position somewhat before arm 78 reaches the straight line A between 71 and 79a. As soon as the leg has passed forward of that vertical position, and then as soon as arm 78 and link 79 have passed that straight line, the leg is locked against being raised by any weight-thrust imposed upon it. From that straight-line position of the arm 78, on to its final position shown in full lines, the leg remains effectively locked. Thus, in the illustrative support here described, it may be considered that during the rotation of arm 78 from its dotted line position to a position approximately on line A the support is being lowered, and that during the whole of the rotation of arm 78 from the dotted line A to its full line position the support is locked.

With the tractor fifth wheel 22 in its full trailer supporting position of Fig. 2 where the trailer is locked to the tractor, the front edge 22a of the fifth wheel lies a distance to the rear of hook 42 and the hook lies in its rearmost position shown in full lines in Fig. 2, extending downwardly from plate 21a in front of the fifth wheel. Tilting member 62 is held up in the position of Fig. 2 by engagement with the upper surface of the rear portion of the fifth wheel. In this position of the parts cable 52a is in its rearmost position and cable 52b is in its forward position. The latter cable 52b holds the support in its raised position shown in dotted lines shown in Fig. 5. To make the connective operation of the cable positive it is preferably clamped to sheave 70 by a clamp indicated at 70a. In this position of the parts cable 52a is also preferably in tension or nearly so; although that is not necessary as will be understood from the following description of operation.

On relative forward motion of fifth wheel 22 after king-pin 25 has been unlocked, the point 22b which defines the effective rear edge of fifth wheel 22 passes the forward lower edge 62a of tilting member 60 either approximately at the same time that front edge 22a of the fifth wheel engages the rear face of hook 42, or preferably somewhat before that time. (These statements are made on the assumption that both cables are in tension when the parts are in the position of Fig. 2.) As soon as point 22b has passed member 62, that member is allowed to drop to or toward the position shown in Fig. 3, releasing the tension on cable 52b and allowing the support to drop, which it usually will if unobstructed.

Further forward movement of fifth wheel 22 then slides hook 40 forwardly in plate slot 45 until such a position as that shown in full lines in Fig. 3 is reached. The relative dimensions of the parts are such that with hook member 40 in the position of Fig. 3, the support-operating arm 78 has been thrown well past the line A and the support has consequently been moved down (forced down if necessary) and into safe locking condition by the time hook member 40 has reached that position. The dotted line B in Fig. 3 indicates the position of the rear face of hook 42 as support operating arm 78 passes the critical line A of Fig. 5.

Further forward movement of the fifth wheel then moves hook member 40 on forwardly until its flange front 43a strikes the inclined wall 36a. Then further forward movement of the fifth wheel forces flange front 43a up inclined wall 36a until the hook member reaches the position shown in dotted lines in Fig. 2, with its nose 45b raised to the point where the nose will ride on the upper surface of the fifth wheel. From that point on the fifth wheel may move out from under the trailer without moving hook member 40 further. During the last movement of the hook member, from the full line position of Fig. 3 to the dotted line position of Fig. 2, cable 52a is moved somewhat forwardly and support-operating arm 78 is moved on toward its final full line position of Fig. 5. Hook member 40 reaches its foremost position either approximately at the time the support operating arm 78 reaches its final position, or just before that time. When tilting member 60 has swung from the position of Fig. 2 to the position of Fig. 3, it has relieved cable 52b sufficiently to allow the support to be moved to its fully operative and locked position by the forward motion of cable 52a. In this condition of the parts it is not necessary that cable 52b be under tension.

When fifth wheel 22 passes out completely from under the trailer, the trailer drops down to be supported by its support, then in fully operative and locked condition. Hook member 40 then usually drops back from the dotted line position of Fig. 2 to approximately the full line position of Fig. 3 and remains in that latter position until the tractor fifth wheel is again backed under the trailer. When that occurs, the following actions take place.

Either the rear edge point 22b of the fifth wheel strikes the inclined forward face 45a of hook member 40; or, if the rear end of the fifth wheel is tilted down excessively, its then rearwardly inclined upper face draggingly contacts the lower nose 45b of hook 42. In either case, the rearward push or drag may push the lower hanging end of the hook toward the rear and, as the upper face of the fifth wheel passes under the hook, it swings the hook nose rearwardly and upwardly until face 45a is flatly riding the upper face of the fifth wheel. See dotted line position of Fig. 3. Slot 35, instead of being formed in a part of plate 21a which is flush with the main plate 21, is formed in an upwardly recessed part of plate 21a, as is best shown in Fig. 4. As shown in that figure the plate parts 21b which lie immediately adjacent the edges of slot 35 are upwardly recessed to form a recess in which hook flanges 45 may ride above the upper face of the fifth wheel when the fifth wheel is in full flat contact with main bearing plate 21.

The purpose of the stop 50, 51, which limits rearward movement of the hook is two-fold. It forms a positive abutment which forces the hook to tip up to the dotted line position of Fig. 3 if the hook has not taken that tipped up position before reaching the stop. It also limits the rearward position of the hook to such a position as shown in full lines in Fig. 2, to insure that the forward edge of the fifth wheel will be to the rear of the depending hook by the time the rear edge of the fifth wheel begins to operate tilting member 60 to unlock and raise the support.

Hook member 40 thus takes a position such as that illustrated in dotted lines in Fig. 3 as the result of the fifth wheel backing under the trailer. Its initial tipped up position may be somewhat forward of the exact position shown in dotted lines in Fig. 3; but at any rate the hook will have reached some such tipped up position by the time the fifth wheel 22 reaches a position where its upper face is under the hook. I may remark here that the extension of fins 45 along the whole front face 45a of the hook is not necessary to the described functions. Only the upper parts of those fins are necessary, acting merely as projecting pins to underride the slot edges and to provide effective pivots on which the hook can swing up to the last described position. The illustrated extension of the fins is however desirable, to limit the up-tilting of the hook to the position shown.

Upon further movement of the fifth wheel toward the rear, the fifth-wheel front edge 22a reaches a position to the rear of hook nose 45b at least before the rear edge 22b has swung tilting member 60 far enough upwardly to move support arm 78 back past line A and thus unlock the support. As a safety factor, the dimensional relations may be such that, when front edge 22a reaches approximately the position shown by the dotted line 22A in Fig. 3, rear edge 22b is in such a position as indicated at 22B in that figure and just about to engage member 60. In that position of the parts, hook 40 is free to drop from the broken line position of Fig. 3 to the full line position of Fig. 2, and thus to drop down ahead of the fifth-wheel forward edge before the rearwardly moving fifth wheel begins to swing member 60 and begins to unlock the support.

Further rearward movement of the fifth wheel to the position of Fig. 2, throws member 60 to the position of that figure and unlocks and raises the support. As cable 50b moves forwardly, cable 50a moves rearwardly and pulls hook 40 to the full line position of Fig. 2 if the hook has not already fully taken that position. In any case the hook is in place ahead of the fifth wheel by the time member 60 has been moved far enough to unlock the support. Although cable 52a is not fully taut in the full line position of Fig. 2 until member 60 is in the position of that figure and the support is fully raised, and cable 52a would not, without some further provision, force dog 40 finally to its full line position of Fig. 2 until that time; there are several facts which make virtually certain that the dog will assume that position by the time the support is unlocked. First, the dog is free to fall and tends to fall to that position as soon as front edge 22a passes it. Second, a steel cable that is put in tension not in a straight line (as cable 52a is put in tension over the idler 49) always has a certain amount of resilient lateral warpage when relieved of tension, resulting in a shortening of its end to end length as measured along its line of tension. Such a cable may be looked at as the equivalent of a perfectly flexible string which has a weak contractive spring in it. And that weak contractive spring is sufficiently strong to pull dog 40 to its final position, if that is necessary, before the support is unlocked. The relatively long movement of the support operating member between the critical locking condition (line A) and the fully locked condition, provides a large margin of safety which compensates for any expectible cable stretch when the cables are under tension in either the leg lowering or leg raising operation.

To make the foregoing described action positive—to positively move hook 40 from the dotted line position of Fig. 3 to the full line position of Fig. 2 during the early part of the unlocking movement and before arm 78 reaches line A—I provide means for positively causing an end-to-end shortening of cable 52a. The cable may pass under a roller such as 52c located close to the hook and at a level below attachment pin 53 when the hook is in the dotted line position of Fig. 3. The sharp bend in the cable which is caused by roller 52c has the effect of shortening the end-to-end length of the cable. This effective shortening is sufficient that, when support-operating arm 78 starts to move in an unlocking direction, and before it reaches the critical locking line A, hook 40 is positively pulled well toward the full line position of Fig. 2 and its hook portion projects in front of the fifth wheel.

Going back again to the position of the hook shown in dotted lines in Fig. 2—the position to which the hook is moved by the outgoing fifth wheel; it will be recalled that the statement was made that the hook may drop from that position to the full line position of Fig. 3. On the other hand it may not drop to the latter position but may remain in the dotted line position of Fig. 2 until the fifth wheel again backs under the trailer. Also, if the hook has dropped to the full line position of Fig. 3, when the fifth wheel backs under the hook may be pushed back up to the dotted line position of Fig. 2 instead of being pushed rearwardly and tipped up to the dotted line position of Fig. 3. In any of these instances the hook is in the dotted line position of Fig. 2 as the fifth wheel passes to the rear under the hook. And then, when the front edge of the fifth wheel has passed to the rear of the hook it may or may not drop down. In case it does not drop down to the full line position of Fig. 3, it is positively pulled down to that position by cable 52a during the early part of the unlocking movement. Thus, under any of these contingencies, the hook is always in a position overhanging the front edge of the fifth wheel before support-operating arm 78 passes critical line A; and further unlocking and raising movement of the support moves the hook back to its full line position of Fig. 2.

Going back for the moment to the formation and positioning of slot 35 in plate 21a, I remark the following. I have said that the slot may be formed in any suitable structure of the trailer. The only parts of the described slot forming structure which have a functional part to play in my invention are those parts of plate 21 which immediately edge the slot—i. e., the relatively raised or recessed parts 21b which lie along the slot edges. Any structure which forms the slot and provides those parts for the hook parts to ride above and under, may be regarded within the terms of my invention as a slot forming plate structure.

Reverting also briefly to the described cable connections. I have said that the use of flexible tension members such as cables is not necessary in my system, but are preferable and that the system makes their use possible because among other things only tensile forces are transmitted through these connecting members. However, in some broader aspects of my invention, connecting members which are not flexible and which are inherently capable of transmitting thrusts may be utilized in substitution for the cables.

The description of operation and relative positions of the parts has so far proceeded on the assumption that the angular movement of support operating arm 78 bears a fixed relation to the longitudinal movements of cables 52a and 52b. That, however need not be the fact. By making that movement ratio variable the safety margins may be substantially increased.

For instance, Figs. 6 and 7 show sheave 70 in a form which will produce a varying movement ratio. The flange 70b at one side of the sheave is broken, and an angular flange 70c leads from the opposite side flange 70d to merge into side flange 70b at a point 70e angularly spaced from the broken end of flange 70b. The tread of the sheave is also broken away at 70f. The cable 52a, 52b, is trained over the sheave tread and through the tread break and over hub 70g. The arrangement is such that, with the support up, the cable and sheave are related as shown in Figs. 6 and 7. On forward movement of hook 40 and cable 52a the angular movement of operating shaft 71 is relatively large until the parts have rotated counterclockwise to the position where cable 52a no longer bears on hub 70g. The relative angular movement then decreases with further rotation until cable 52a is pulling on the sheave at its full radius. That occurs, in this illustrative showing, when the sheave reaches a position approaching that of Fig. 5. The movement ratio in the position of Fig. 7 (support up) is determined by the size of hub 70g; and the ratio in the position of Fig. 5 (support down and finally locked) by the radius of the sheave tread. The sizes of both hub and tread are made such that support operating arm 78 swings through its full operating angle with movement of dog 40 through its full traverse. The general operation is the same as before except that, due to the changing movement ratio, operating arm 78 reaches critical locking line A on lowering movement when dog 40 has moved forward a distance substantially shorter than that respresented by line B in Fig. 3. The safety margin is thus increased; and at the same time the dog is given an increased mechanical advantage over the support during the latter part of support lowering and locking where it is most likely that the support may have to be forced down.

Throughout the foregoing description of the illustrative form of my invention I have referred to the hook 40 lying normally forward of the forward edge of the fifth wheel and as being actuated by that edge; and to member 60 being actuated by the rear end or edge of the fifth wheel. Specifically, that particular arrangement is preferable, to make the parts cooperate with standard fifth wheels without modifying or changing them. However, as will be readily understood from the described functions of the parts, the hook may normally lie forward of and be operated by any forwardly facing part or surface or shoulder on a fifth wheel, whether that part is or is not the most forward end or edge of the wheel; and the same considerations apply to the relation of member 60 to the rear edge or to any rearwardly facing part or surface of a fifth wheel. Consequently when I say that those members lie forwardly and rearwardly of the fifth wheel, I mean that they lie forwardly and rearwardly of any suitable forwardly and rearwardly facing surfaces with which any non-standard fifth wheel may be equipped. Although the invention provides means cooperating with a standard fifth wheel, it is not necessarily limited to that use.

I claim:

1. In a tractor and semi-trailer combination in which the tractor is provided with a trailer supporting element in the nature of a fifth wheel adapted to move longitudinally under the trailer and to support the trailer by engagement with the trailer structure at a normally substantially horizontal supporting plane, and the trailer is provided with a support movable between supporting and non-supporting positions; the combination which includes a member movably mounted on the trailer and adapted normally to lie in the path of and in front of the fifth wheel when the latter is in its normal trailer-supporting position and adapted to be moved forwardly by the fifth wheel moving forwardly, means on the trailer guiding said member in a line of movement which extends first forwardly and then forwardly and upwardly, a flexible connecting member between said movable member and the support and operating to move the support to supporting position when said member moves forwardly, and means independent of said movable member adapted to be engaged and operated by the fifth wheel moving rearwardly to cause movement of the trailer support to non-supporting position.

2. The combination defined in claim 1, and in which the last mentioned means includes a member movably mounted on the trailer and adapted to be forcibly moved by the fifth wheel moving rearwardly, and a flexible connecting member extending between said movable member and the support.

3. In a tractor and semi-trailer combination in which the tractor is provided with a trailer supporting element in the nature of a fifth wheel adapted to move longitudinally under the trailer and to support the trailer by engagement with the trailer structure at a normally substantially horizontal supporting plane, and the trailer is provided with a support movable between supporting and non-supporting positions; the combination which includes a structure on the forward end of the trailer having a horizontal part which is substantially in the plane of the supporting plane and having a forward up-turned part, a longitudinal hook guiding slot formed in the horizontal and forward up-turned parts of the structure, a hook guided longitudinally by the slot and having a body adapted to ride the upper surface of the structure at the slot edges, and a depending hook portion projecting through the slot and normally below the lower surface of the slot-forming structure, said hook portion projecting downwardly into the path of longitudinal movement of the fifth wheel and adapted to be moved forwardly and upwardly along the slot by forward movement of the fifth wheel, operative connection between the hook and the trailer support adapted to cause movement of the support to supporting position when the hook moves forwardly, and means independent of the hook adapted to be engaged and operated by the fifth wheel moving rearwardly to cause movement of the trailer support to non-supporting position.

4. The combination defined in claim 3, and in which the horizontal part of the slot forming structure is spaced above the supporting plane, and in which the depending hook portion is provided with a downwardly and rearwardly inclined forward face and with a lateral projection that underlies the lower surface of the structure at the slot edge.

5. The combination as defined in claim 3, and in which the operative connection between the hook and the support comprises a flexible tension member, and in which the last mentioned means includes a member movably mounted on the trailer and adapted to be moved by the fifth wheel moving rearwardly, and a flexible tension member connecting the movable member with the support.

6. In a tractor and semi-trailer combination in which the tractor is provided with a trailer supporting element in the nature of a fifth wheel adapted to move longitudinally under the trailer and to support the trailer by engagement with the trailer structure at a normally substantially horizontal supporting plane, and the trailer is provided with a support movable between supporting and non-supporting positions; the combination which includes a support operating and locking member having a back-and-forth movement one terminal part of which causes movement of the support to and from supporting position and another terminal part of which causes locking and unlocking of the support in its supporting position, and means for moving said operating member comprising an actuating member longitudinally movable on the trailer and adapted normally to lie in the path of and in front of the fifth wheel when the latter is in its normal trailer-supporting position and adapted to be moved forwardly by the fifth-wheel moving forwardly, a connecting element between said actuating member and the support operating member adapted to cause movement of the latter in the direction to move it to supporting position and finally lock it when the actuating member is moved forwardly, means limiting the rearward movement of the actuating member on the trailer to a position spaced forward of the front edge of the fifth wheel in its normal position, and means independent of the actuating member and mounted on the trailer, in a position to be engaged and moved by the fifth wheel moving rearwardly after passing the rearmost position of the actuating member, said means adapted by such movement to move the support operating member in a direction to unlock the support and move it to non-supporting position.

7. In a tractor and semi-trailer combination in which the tractor is provided with a trailer supporting element in the nature of a fifth wheel adapted to move longitudinally under the trailer and to support the trailer by engagement with the trailer structure at a normally substantially horizontal supporting plane, and the trailer is provided with a support movable between supporting and non-supporting positions; the combination which includes a structure on the forward end of the trailer having a horizontal part which is substantially in the plane of the supporting plane and having a forward up-turned part, a longitudinal hook guiding slot formed in the horizontal and forward up-turned parts of the structure, a hook guided longitudinally by the slot and having a body adapted to ride the upper surface of the structure at the slot edges, and a depending hook portion projecting through the slot and normally below the lower surface of the slot forming structure, said hook portion projecting downwardly into the path of longitudinal movement of the fifth wheel and adapted to be moved forwardly and upwardly along the slot by forward movement of the fifth wheel, and operative connection between the hook and the trailer support adapted to cause movement of the support to supporting position when the hook moves forwardly.

8. The combination defined in claim 7 and in which the horizontal part of the slot forming structure is spaced above the supporting plane, and in which the depending hook portion is provided with a downwardly and rearwardly inclined forward face and with a lateral projection that underlies the lower surface of the slot-forming structure at the slot edge.

9. The combination defined in claim 7 and in which the depending hook portion is located at the forward end of the hook body and is provided with a lateral projection that underlies the lower surface of the slot-forming structure, said projection forming, by engagement with the under face of the slot-forming structure, a pivot about which the hook body may swing relatively upwardly from the slot-forming structure, and in which the operative connection between the hook and the trailer support is flexible.

10. In a tractor and semi-trailer combination in which the tractor is provided with a trailer supporting element in the nature of a fifth wheel adapted to move longitudinally under the trailer and to support the trailer by engagement with the trailer structure at a normally substantially horizontal supporting plane, and the trailer is provided with a support movable between supporting and non-supporting positions; the combination which includes two support operating members mounted in longitudinally spaced positions on the trailer, each of said members having a position projecting downwardly below the horizontal supporting plane and the spacing of said members being such as to receive the fifth wheel between their two said positions, means mounting the rearward one of said members on the trailer for movement rearwardly from its stated position, means mounting the forward one of said members on the trailer for movement forwardly and upwardly from its stated position, and support-operating connective means between the two members and the trailer support.

11. The combination defined in claim 10 and in which the two said movable members are mutually independent, and in which the connective means embodies flexible connective elements acting in tension only between each of said members and the support.

12. In a tractor and semi-trailer combination in which the tractor is provided with a trailer supporting element in the nature of a fifth wheel adapted to move longitudinally under the trailer and to support the trailer by engagement with the trailer structure at a normally substantially horizontal supporting plane, and the trailer is provided with a support movable between supporting and non-supporting positions; the combination which includes guide means on the trailer structure, a hook-shaped member with a forward downwardly projecting hook element and a shank body extending normally rearwardly from the hook element, said member being pivotally mounted near its forward end on the guide means, said guide means guiding said member in a line of movement which extends forwardly and upwardly from a rearward position, in which the hook element normally projects below the said horizontal supporting plane and is adapted in that position to lie in the path of and in front of the fifth wheel when the latter is in its normal trailer supporting position, to a forward position in which the hook element is raised clear of the fifth wheel, a connective member connected at its rear end to the support and connected flexibly at its forward end to the hook shank at a point rearward of the pivotal mounting of the hook member; all whereby the forward pressure of a forwardly moving fifth wheel on the downwardly projecting hook element moves the hook member forwardly until the hook element clears the fifth wheel, and a rearwardly moving fifth wheel contacting the forward face of the depending hook element may swing that element rearwardly and upwardly to clear the fifth wheel.

13. In a tractor and semi-trailer combination in which the tractor is provided with a trailer supporting element in the nature of a fifth wheel adapted to move longitudinally under the trailer and to support the trailer by engagement with the trailer structure at a normally substantially horizontal supporting plane, and the trailer is provided with a support movable between supporting and non-supporting positions; the combination which includes a structure on the forward end of the trailer having a horizontal part which is substantially in the plane of the supporting plane and having a forward up-turned part, a longitudinal hook guiding slot formed in the horizontal and forward up-turned parts of the structure, a hook member having a normally longitudinally extending shank body adapted normally to ride the upper surface of the structure at the slot edges and a hook portion at the forward end of the shank projecting through the slot and normally below the lower surface of the slot forming structure into the path of longitudinal movement of the fifth wheel, said hook member being mounted on the slot-forming formation by a pivotal formation which allows the depending hook portion to be swung upwardly and rearwardly, and an operative connective member connected at its rear end to the support and flexibly connected at its forward end to the rear end of the hook shank so as to allow upward swinging of the hook shank when the hook portion is swung upwardly and rearwardly.

WALTER BENNETT.

REFERENCES CITED

The following references are of record in the file of this patent:

UNITED STATES PATENTS

| Number | Name | Date |
|---|---|---|
| 2,135,205 | Wilson | Nov. 1, 1938 |
| 2,277,179 | Winn | Mar. 24, 1942 |